Dec. 29, 1964 W. G. PUSCH 3,162,895
PIPE INSULATION
Filed Dec. 9, 1958 3 Sheets-Sheet 1
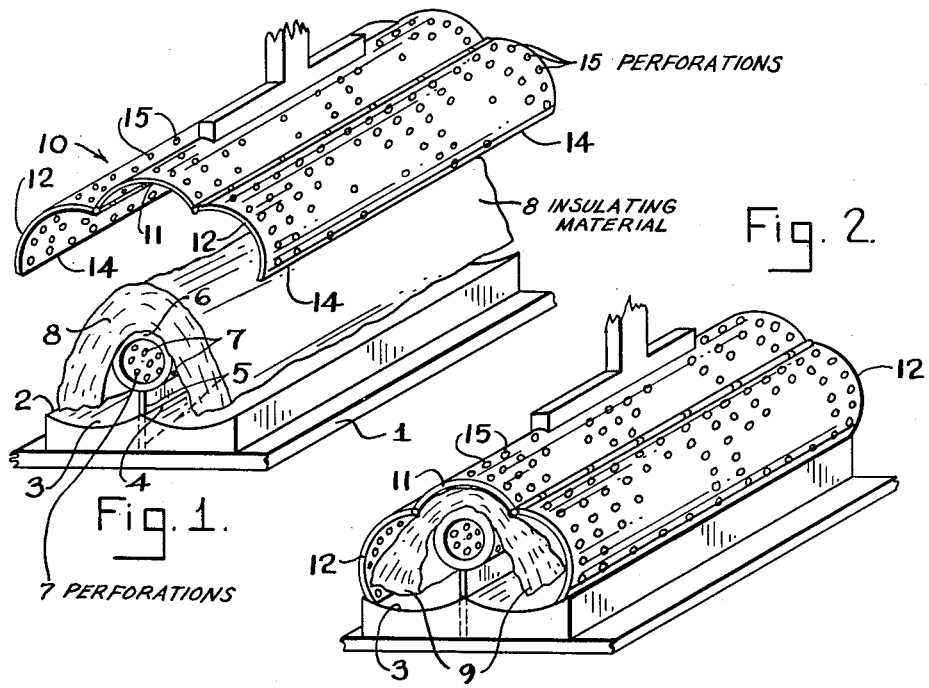
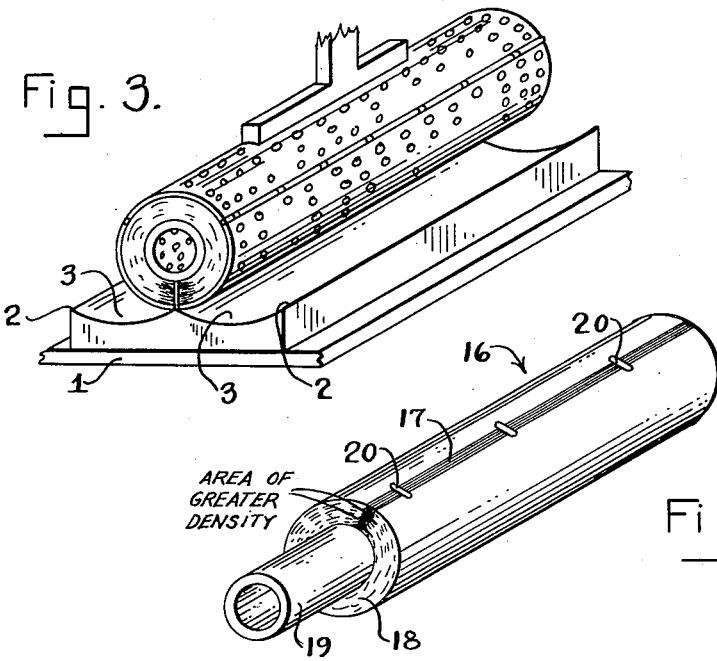
INVENTOR.
WALTER G. PUSCH
BY
ATTORNEY

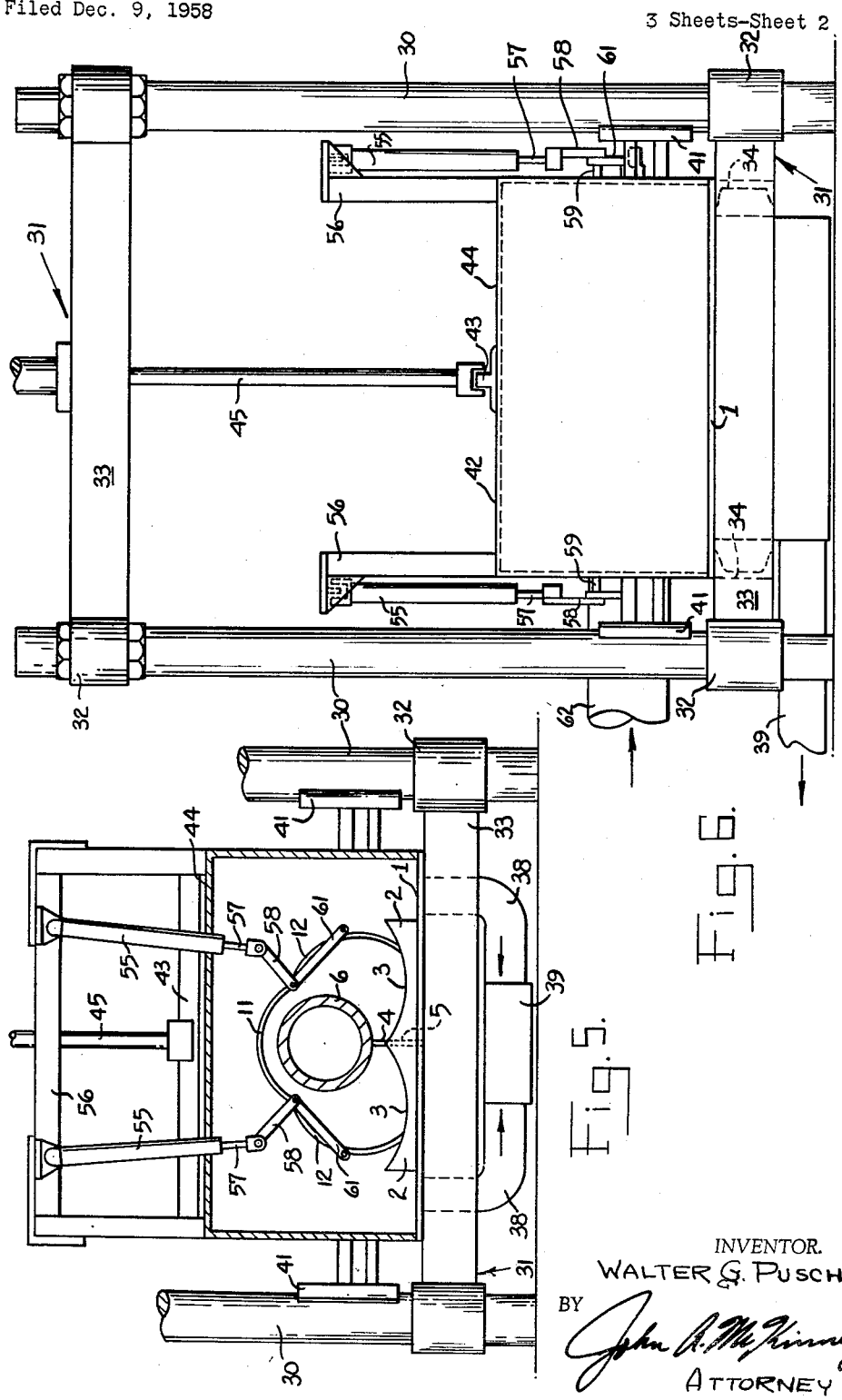

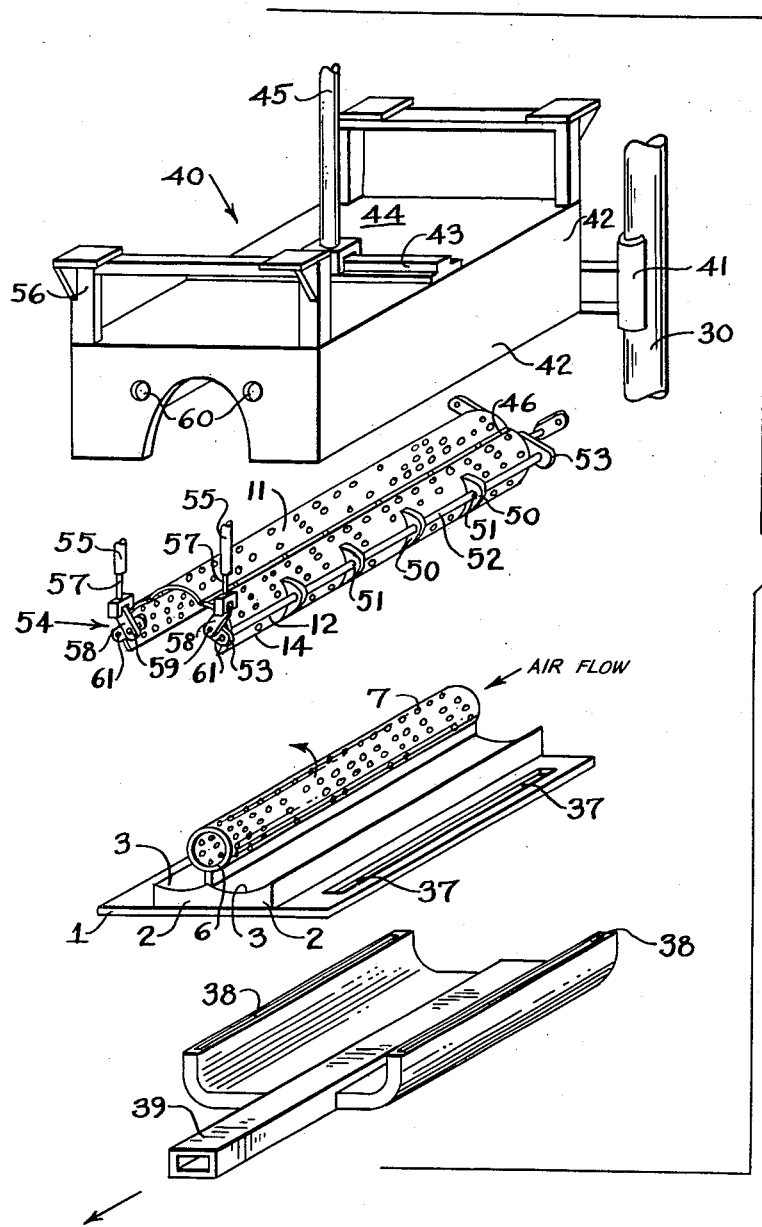

United States Patent Office 3,162,895
Patented Dec. 29, 1964

3,162,895
PIPE INSULATION
Walter G. Pusch, New Brunswick, N.J., assignor to Johns-Manville Corporation, New York, N.Y., a corporation of New York
Filed Dec. 9, 1958, Ser. No. 779,197
5 Claims. (Cl. 18—5)

This invention relates to a method and apparatus for producing a circular insulation and is particularly directed to a method and apparatus for producing fully round pipe insulation by press molding. The pipe insulation is formed from any fibrous insulating material such as, asbestos, rock wool, mineral wool, glass or synthetic fiber.

It is a primary object of this invention to provide a method and apparatus for press molding fully round pipe insulation having only one longitudinal slit so that the insulation may be spread apart and snapped into position around a pipe. It is another object of this invention to provide a method and apparatus for producing fully round pipe insulation having only one longitudinal slit and which insulation is heavily densified along the longitudinal slit.

The foregoing objects are accomplished in accordance with the instant invention by a press mold comprising a perforated mandrel attached to a separating wall, a three piece, perforated hinged cage and a pair of arcuate surfaced guides. The stationary portion of the mold is formed by a base having a pair of integral guides and which is provided with a slot to receive the separating wall to which is attached the perforated mandrel. The three piece, perforated hinged cage is mounted for reciprocal movement in a vertical direction. The cage has a central arcuate section which extends for approximately 120° and two arcuate hinged portions, each extending for approximately 120°. In operation, a felt of insulating material is positioned over the mandrel so that each of the free edges of the felt is adjacent to one of the curved guides. The hinged cage is lowered into contact with the felt on the mandrel and the movement thereof is continued until the central section of the felt is compressed to a predetermined thickness. The hinged arcuate portions are then moved to compress the felt against the mandrel to form the fully round pipe insulation. The guides, between which the mandrel is positioned, are shaped so that the surface contour of each of the guides facing the hinged cage is described substantially by the arc of the circle on which the hinged section pivots. In view of this definite curvature, the outer edges of the hinged sections continuously contact the surface of the guides during closure of the hinged sections as the felt is wrapped around the mandrel. This particular surface contour of the guides eliminates the need for hand-tucking and allows the felt to be compressed against the mandrel and its separating wall so that the areas of the pipe insulation bordering the separating wall are heavily densified. The apparatus thus functions to produce a fully round pipe insulation having a longitudinal slit so that the insulation may be spread apart and snapped into position around a pipe and in which the areas adjacent the closing slit are desirably more highly densified.

The invention will be more fully understood and further objects and advantages thereof will become apparent when reference is made to the following detailed description of a preferred embodiment of the invention and the accompanying drawings in which:

FIGS. 1–3 are pictorial schematic representations of apparatus functioning in accordance with the instant invention;

FIG. 4 is a pictorial view of a pipe insulation made in accordance with the instant invention;

FIG. 5 is a view in front elevation, with parts removed, of the apparatus for forming pipe insulation;

FIG. 6 is a view in side elevation of the apparatus of FIG. 5; and

FIG. 7 is an exploded view of associated sections of the apparatus.

Referring to the drawings and in particular to FIGS. 1–3, there is disclosed schematically apparatus for the press molding of fully round pipe insulation. A base 1 is provided with a pair of side guides 2 each of which has a concave arcuate surface 3. The base 1 is further provided with a longitudinally extending slot 4 between the guides 2. The slot 4 is adapted to receive a separating wall 5 to which is attached a mandrel 6 having a plurality of perforations 7. The mandrel 6 is positioned above and between the guides 2 so that a felt 8 of insulating material impregnated with a conventional unset binder may be positioned over the mandrel 6, as viewed in FIG. 2, with the free edges 9 of the felt 8 adjacent each associated arcuate surface 3. The mandrel 6 is adapted to form the male die of the press mold for forming the pipe insulation and has an outside diameter substantially equal to the outside diameter of the pipe to be insulated. The female die for the press mold consists of a hinged cage 10 having a central section 11 and two side portions 12 pivotally mounted to the central section 11 by piano hinges or the like. The central section 11 is formed as an arcuate section extending approximately 120° and having a radius of curvature which is substantially equal to the radius of the outside diameter of the finished pipe insulation. Each of the side portions 12 is formed as an arcuate section extending approximately 120° and having a radius of curvature which is substantially equal to the radius of the outside diameter of the finished pipe insulation. Thus, when the side portions 12 are closed so that the free edges 14 thereof are in abutting relationship with the separating wall 5, they cooperate with the central section 11 to form a hollow cylindrical tube having a diameter substantially equal to the desired outside diameter of the finished pipe insulation. The central section 11 and the side portions 12 have a plurality of perforations 15 therein for a purpose to be later described.

The operation of the apparatus is schematically illustrated in FIGS. 2 and 3. A felt of insulating material is positioned over the mandrel 6 so that the free edges 9 of the felt 8 are adjacent the arcurate surfaces 3 of the guides 2. The hinged cage is moved toward the mandrel 6 until the central section 11 contacts the outer surface of the felt 8. The movement of the central section 11 is continued until the felt 8 of insulating material is compressed between the central section 11 and the mandrel 6 to the thickness of the desired pipe insulation. The side portions 12 are then actuated by a mechanism, to be later described, to wrap the remaining portions of the felt 8 of insulating material around the mandrel 6. It is to be emphasized that the central section 11 should be in its final position before the side portions 12 begin to close. The path described by the free edges 14 of the side portions 12 when pivoted and the radius of curvature of the arcuate surface 3 of the side guides 2 are of a critical nature to be explained later. As the side portions 12 approach the separating wall 5, the excess amount of insulating material is gradually compressed between the separating wall 5, the mandrel 6, the side portion 12 and the arcuate surface 3 of the guides 2 by the action of the side portions 12 so that the areas of the insulating material adjacent the separating wall 5 are more densified than the remaining areas of the felt 8. After the side portions 12 have been closed to abut the separating wall 5, hot air is introduced to the interior of the mandrel 6 to cure the unset binder in the felt of insulating material and thus form the final pipe insulation which is then removed from the mandrel 6 by any conventional practice.

In the apparatus illustrated in FIGS. 1–3 it should be particularly noted that the radius of curvature of the arcuate surface 3 of the guides 2 is that described by the radius on which the side portions 12 are pivoted. Thus, the radius of curvature of each surface 3 of the side guides 2 is defined by the path followed by the free edge 14 of the side portion 12 when moved to a closed position against the separating wall 5. As each side portion 12 moves toward the separating wall 5, as viewed in FIGS. 2 and 3, the free edge 14 thereof is thus at all times substantially in contact with the arcuate surface 3 of the adjacent side guide 2. In this manner, the felt 8 of insulating material is continuously contained within the area defined by the arcuate surface 3, the separating wall 5, the mandrel 6 and the associated side portion 12. It is, therefore, deemed essential that the free edge of each side portion substantially contact the arcuate surface of the associated guide continuously during the formation of the pipe insulation.

In FIG. 4 there is illustrated a finished pipe insulation 16 made in accordance with the instant invention. The pipe insulation 16 is fully round and has a longitudinal slit 17 so that the pipe insulation may be spread open along the slit and snapped into position around a pipe. The main body 18 of the pipe insulation 16 is of generally homogeneous density. As the area along the longitudinal slit 17 is approached, the pipe insulation becomes more dense until the area immediately adjacent the longitudinal slit 17 is reached wherein the density of the pipe insulation is substantially greater than the density at other areas. This highly densified area presents a strong surface that is not readily ruptured as the insulation is opened and snapped into position around the pipe 19. The inherent resiliency of the pipe insulation retains the adjacent densified edges of the pipe insulation in abutting relationship. If desired, a more positive securement may be provided by inserting a plurality of positive closures 20 bridging the slit 17 at spaced intervals.

In FIGS. 5–7, there is disclosed apparatus which functions to produce pipe insulation in accordance with the schematic representation explained above. In the description of FIGS. 5–7, parts corresponding to those parts described in connection with the schematic representations of FIGS. 1–3 will be given the same reference characteristics as used in conjunction with the explanation of FIGS. 1–3. The main frame for the apparatus comprises a plurailty of supporting poles 30 which are retained in fixed position by lower and upper rigid members 31. Each member 31 consists of a plurality of cylindrical sleeves 32 each of which is positioned around a pole 30 with straight bracing legs 33 extending between and connected to adjacent sleeves. The sleeves 32 are retained in proper position on the poles 30 by any conventional mechanism.

The base 1 is secured to a pair of channel irons 34 which are attached to opposite side bracing legs 33 of the lower member 31. On the base 1, there are fixedly mounted a pair of side guides 2 each having a concave arcuate surface 3. The guides 2 are so positioned to form a slot 4 for receiving the separating wall 5 to which is secured a mandrel 6 having perforations 7. The base 1 is provided with a plurality of openings 37 for a purpose to be later described. A duct 38 leads from each opening 37 to a central exhaust conduit 39. The mandrel 6 forms the male die of the press mold apparatus and is fixed in position.

The movable female element of the press roll apparatus comprises a frame 40 having a plurality of runners 41 in sliding engagement with each pole 30. The frame 40 comprises an inverted boxlike member 42 having a central bar 43 secured to the panel 44. A rod 45 is pivotally connected to the bar 43 and is reciprocated in a vertical plane by suitable mechanism (not shown) to move the frame 40 along the poles 30 on the runners 41.

The movable frame 40 carries the hinged cage 10 which is secured in fixed position to the frame 40 within the inverted boxlike member 42 for movement therewith. The hinged cage 10 has a central arcuate section 11 and two side portions 12 pivotally connected thereto by suitable means such as piano hinges 46 or the like. Each of the hinged portions 12 is provided with a series of plates 50 having aligned openings 51 through which extends a rotatable rod 52. Each end 53 of the rods 52 is pivotally secured to a lever assembly 54 which is operatively connected to a hydraulic cylinder 55. Each hydraulic cylinder 55 is pivotally attached to a channel iron structure 56 permanently secured to the inverted boxlike member 42. Each hydraulic cylinder 55 is connected to a source of hydraulic fluid supply by any conventional mechanism (not shown).

Each lever assembly 54 consists of a first arm 58 pivotally connected at one end to the piston 57. The other end of the arm 58 is secured to a connecting rod 59 which is rotatably mounted in opening 60 of the inverted boxlike member 42. A second arm 61 is secured at one end to the connecting rod 59 for rotation therewith. The other end of the arm 61 is pivotally secured to the end of rod 52. The pistons 57 of the hydraulic cylinders 55 function through the lever assemblies 54 to move the side portions 12 to the closed position. As the piston 57 is extended by hydraulic pressure, the arm 58 rotates the connecting rod 59 which rotates arm 61 to move the side portions 12. The free edges 14 of the side portions 12 describe an arcuate path having a radius of curvature substantially identical to that described by the concave arcuate surfaces 3. The side portions 12 are moved until the free edges 14 abut the separating wall 5 to form with the central section 11 a hollow cylindrical tube having an inside diameter substantially equal to the desired outside diameter of finished pipe insulation. As previously stated the central section 11 and the side portions 12 have a plurality of perforations 15.

The apparatus illustrated in FIGS. 5–7 is provided with a heating system for curing the unset binder in the felt 8 of insulating material compressed around the mandrel 6. A hot air duct 62 has one end connected to a source of hot air or steam (not shown) while the other end is connected to the mandrel 6. Hot air or steam is fed into the interior of the mandrel 6 and flows out through the perforations 7 and then passes through the felt of insulating material to cure the same. As the unset binder in the felt of insulating material is cured, it is set into the cylindrical shape defined by the space between the mandrel 6 and the hollow cylinder formed by the closed cage 10. The hot air or steam then passes through the perforations 15 and the openings 37 to the exhaust conduit 39 via the ducts 38. The above apparatus is described for purposes of illustration only and it is not intended to limit the invention thereto. Thus, if desired, the heating system may be replaced by readily removable mandrels. After the felt of insulating material has been compressed around the mandrel, it would be removed together with the mandrel and hinged cage section and placed in an oven for curing and a new mandrel and hinged cage section inserted into the apparatus.

The operation of the apparatus disclosed in FIGS. 5–7 is the same as that described previously in connection with FIGS. 1–3. Different sized pipe insulations are readily accommodated by changing the base 1 with the side guides 2 and the mandrel 6 together with the hinged cage 10. In accordance with the instant invention, these sections are so related that the operation of each is in most instances dependent upon the close cooperation between the various sections. However, in cases where the outside diameter of a pipe insulation remains constant as the inside diameter varies, it would only be necessary to change the size of the mandrel.

Successful operation was accomplished with apparatus designed to form 12" pipe size, 2" thick mineral fiber pipe insulation from pre-cut felts. The apparatus consisted of a base 1 which supported a horizontally positioned forming mandrel, perforated by 1/8" holes on 1/4" staggered centers, on a dividing wall in a 1/2" wide slot located between a pair of side guides 2. A mineral fiber felt, 6" thick, and containing unset binder, was trimmed to 40" in the direction of axial length of the finished pipe insulation and a width of 50". The outer cage was contained within a movable frame and consisted of a metal cylinder, perforated with 3/32" holes on 5/32" staggered centers, hinged longitudinally at two points with the center section 11 rigidly positioned so that when the hood was lowered there would be a 2" separation between the mandrel and the cage. The two hinged portions 12 of the cage were attached to pressure cylinders so that they could be brought into final position to hold the mineral fiber felt while the binder therein was cured by passing hot air into the perforated mandrel and outwardly through the felt. A pipe insulation having a density of 6.6 p.c.f. was satisfactorily cured with 500° F. air in 2 minutes. The differential pressure in the system varied from 6.8 to 7.6 inches of water. The above is given for illustration only and it is to be understood that all sizes of pipe insulation for 3/8" to 32" pipe with wall thicknesses from 1/2" to 3" can be successfully made on apparatus similar to that described above.

While the invention has thus been described in rather full detail, it will be understood that these details need not be strictly adhered to and that various changes and modifications may suggest themselves to one skilled in the art, all falling within the scope of the invention as defined by the subjoined claims.

What I claim is:

1. Apparatus for forming pipe insulation comprising a pair of guides having arcuate surfaces formed therein, a mandrel, means for supporting said mandrel between said guides and above said guides so that a felt of insulating material may be deposited on said mandrel with the free edges of said felt adjacent said arcuate surfaces, said mandrel forming the male die of a mold, a female die, said female die having a central section and flanking said central section and pivotally secured thereto a pair of side portions having outer edges, each of said arcuate surfaces having a radius of curvature defined by the path described by the outer edges of said pivoted portions, means for moving said female die toward said mandrel to compress a central portion of said felt positioned therebetween, and means for actuating said side portions of said female die so that said side portions will move the remainder of said felt of insulating material around said mandrel, said outer edges of said side portions being substantially in contact with the adjacent portion of said arcuate surfaces of said guides during said movement.

2. Apparatus for forming pipe insulation comprising a base, said base having a pair of guides formed in a surface thereof, a mandrel, said mandrel having a depending separating wall attached thereto, means for supporting said separating wall in said base between said guides so that said mandrel is spaced from and above said guides so that a felt of insulating material may be deposited on said mandrel with the free edges of said felt adjacent said guides, a female die, said female die having a central section and flanking said central section and pivotally secured thereto a pair of side portions having outer edges, each of said guides having an arcuate surface, the radius of curvature of each of said arcuate surfaces being defined by the path described by the outer edge of each of said pivotally mounted side portions, means for moving said female die toward said mandrel to compress a central section of said felt positioned therebetween, and means for actuating said side portions of said female die so that said side portions will move the remainder of said felt of insulating material around said mandrel and compress said free edges of said felt against said separating wall, said outer edges of said side portions being substantially in contact with the adjacent portion of said arcuate surfaces of said guides during said movement.

3. Apparatus for forming a pipe insulation comprising a base, said base having a pair of guides formed in a surface thereof, a mandrel, said mandrel having a depending separating wall attached thereto, means for supporting said separating wall in said base between said guides so that said mandrel is spaced from said guides so that a felt of insulating material may be deposited on said mandrel with the free edges of said felt adjacent said guides, a female die mounted for reciprocal movement, said female die having a central section and flanking said central section and pivotally secured thereto a pair of side portions having outer edges, each of said guides having an arcuate surface, the radius of curvature of each of said arcuate surfaces being defined by the path described by the outer edge of each of said pivotally mounted portions when said guides are used to fold said felt of insulating material around said mandrel, means for moving said female die into and out of engagement with said felt of insulating material, means for applying a predetermined pressure to said female die so that a central portion of said felt of insulating material is compressed between said central section of said female die and said mandrel, and means for actuating said side portions of said female die so that said side portions will move the remainder of said felt of insulating material around said mandrel and in compressed condition against said mandrel and also compress said free edges of said felt against said separating wall, said outer edges of said side portions being substantially in contact with the adjacent portion of said arcuate surfaces of said guides during said movement.

4. Apparatus for forming a pipe insulation comprising a base, said base having a pair of guides formed in a surface thereof, a hollow, foraminous mandrel, means for supporting said hollow, foraminous mandrel on said base between and above said guides so that a felt of insulating material containing uncured binder may be deposited on said mandrel with the free edges thereof adjacent said guides, said mandrel having a generally cylindrical peripheral surface and forming the male die of a mold, a female die having a central section having an arcuate surface facing said mandrel and a pair of side portions pivotally secured thereto and having similar arcuate surfaces facing said mandrel, each of said arcuate surfaces of said female die extending for approximately 120°, each of said guides having an arcuate surface facing vertically upwardly from said base, the radius of curvature of said arcuate surface of each of said guides being defined by the path described by the outer edge of each of said pivotally mounted side portions, said central section and said side portions having perforations formed therein, means for moving said famale die into and out of engagement with said felt of insulating material, means for applying a predetermined pressure to said female die so that a central portion of said felt of insulating material is compressed between said central section of said female die and said mandrel, means for actuating said side portions of said female die so that said portions will move the remainder of said felt of insulating material around said mandrel, said outer edges of said side portions being substantially in contact with the adjacent portion of said arcuate surfaces of said guides during said movement, and means for supplying a heated fluid to the interior of said hollow mandrel to cure said uncured binder in said felt of insulating material.

5. Apparatus for forming a pipe insulation comprising a base, said base having a pair of guides formed in a surface thereof, a hollow, foraminous mandrel, said hollow, foraminous mandrel having a depending separating wall attached thereto, means for supporting said separating wall in said base approximately midway between and above said guides so that said mandrel is spaced from said guides so that a felt of insulating material containing uncured binder may be deposited on said mandrel with the free edges of said felt adjacent said guides, said mandrel having an outside diameter substantially equal to the inside diameter of said pipe insulation, a female die mounted for reciprocal movement, said female die having a central section and flanking said central section and pivotally secured thereto a pair of side portions having outer edges, said central section having an arcuate surface facing said hollow, foraminous mandrel, said side portions having arcuate surfaces facing said hollow, foraminous mandrel, said central section and said side portions when in closed position forming a hollow cylinder having an inside diameter substantially equal to the outside diameter of said pipe insulation, said central section and said side portions having perforations formed therein, each of said guides having an arcuate surface facing vertically upwardly from said base, the radius of curvature of said arcuate surface being defined by the path described by the outer edge of each of said pivotally mounted portions, when said guides are used to fold said felt of insulating material around said mandrels, means for moving said female die into and out of engagement with said felt of insulating material, means for applying a predetermined pressure to said female die so that a central portion of said felt of insulating material is compressed between said central section of said female die and said mandrel, means for actuating said portions of said female die so that said portions will move the remainder of said felt of insulating material around said mandrel and compress its longitudinal edges against said separating wall, said outer edges of said side portions being substantially in contact with the adjacent portion of said arcuate surfaces of said guides during said movement and means for supplying a heated fluid to the interior of said hollow mandrel to cure said uncured binder in said felt of insulating material.

References Cited in the file of this patent

UNITED STATES PATENTS

| | | |
|---|---|---|
| 1,735,684 | Jurgensen | Nov. 12, 1929 |
| 1,860,203 | Rishel | May 24, 1932 |
| 2,350,996 | Atkinson et al. | June 13, 1944 |
| 2,441,699 | Gramelspacher | May 18, 1948 |
| 2,778,405 | Stephens et al. | Jan. 22, 1957 |
| 2,778,759 | Stephens et al. | Jan. 22, 1957 |